OR 3,993,398

United States Patent [19]

Noguchi et al.

[11] 3,993,398

[45] Nov. 23, 1976

[54] DEVICE FOR RECONSTRUCTING COLOR HOLOGRAPHIC IMAGE

[75] Inventors: Masaru Noguchi; Shingo Ooue, both of Asaka, Japan

[73] Assignee: Fuji Photo Film Co., Ltd., Minami-ashigara, Japan

[22] Filed: July 25, 1975

[21] Appl. No.: 599,038

[30] Foreign Application Priority Data

July 26, 1974 Japan .............................. 49-86200

[52] U.S. Cl. ............................ 350/3.5; 350/162 SF

[51] Int. Cl.[2] ............................ G03H 1/24

[58] Field of Search ......................... 350/3.5, 162 SF

[56] References Cited

UNITED STATES PATENTS

| | | | |
|---|---|---|---|
| 3,834,786 | 9/1974 | Carlsen | 350/3.5 |
| 3,917,378 | 11/1975 | Gale | 350/3.5 |
| 3,917,379 | 11/1975 | Noguchi | 350/3.5 |
| 3,924,925 | 12/1975 | Gale et al. | 350/3.5 |

*Primary Examiner*—Ronald J. Stern
*Attorney, Agent, or Firm*—Gerald J. Ferguson, Jr.; Joseph J. Baker

[57] ABSTRACT

A white light source is employed for illuminating a color image hologram have no effect of diffusion. The primary or first order diffraction light is directed to and focused on a spectrum selecting spatial filter for selecting the spectra which contribute to form a multicolor image reconstructed by the hologram. The spatial filter is provided with a central slit of the width substantially equally to the band width of the spatial frequency peculiar to the object recorded and reconstructed. The spatial filter is further provided with a red filter and a blue filter on the opposite sides of the slit adjacent thereto. By providing the red and blue filters adjacent to the slit of the spatial filter, the brightness of the image reconstructed by the color halogram reconstructing system is markedly enhanced.

8 Claims, 6 Drawing Figures

DEVICE FOR RECONSTRUCTING COLOR HOLOGRAPHIC IMAGE

BACKGROUND OF THE INVENTION

1. Field of the Invention

This invention relates to a holographic color image reconstructing device, and more particularly to a device for reconstructing a bright color image hologram by use of a white light source.

2. Description of the Prior Art

In holography, color or non-color, it is a great desire to increase the diffraction efficiency that is the rate at which the energy of the light beam contributing to reconstruction of images occupies the total energy of the reconstruction light beam. Owing to the low diffraction efficiency, the field of application of holography has been materially limited. Particularly, it has been considered almost impossible to apply the holographic techniques to the field of audio-visual education wherein a number of people observe a single large projection screen on which holographic images are reconstructed.

In order to enhance the diffraction efficiency in holography, it has been proposed to use a phase-only hologram which records holographic information by use of phase variation of the recording media. For phase-only materials, the required phase shift of the reconstruction wave is provided through the local variations in the thickness and/or the refractive index of the recording medium. When photograhic emulsions which are absorptive are employed for the phase-only materials, developed photographic emulsions are bleached in a manner such that a phase-only image will remain. The diffraction efficiency when photographic emulsions are used, however, is very low. For instance, even when information of a single point is recorded and reconstructed, the diffraction efficiency is about 30% at highest. When a general object is recorded and reconstructed the diffraction efficiency is as low as several percent. Further, the dichromate sensitized gelatin, lithium niobate or photosensitive resist are known to be used as phase-only materials. However, gelatin dichromate cannot be practically used due to its short life, lithium niobate cannot be used either due to its very low sensitivity and the photosensitive resist is disadvantageous in that the range of the sensitive wavelength is limited between 200 and 500 m$\mu$.

Therefore, from the viewpoint of the characteristics of various recording materials, there is a limit in the diffraction efficiency in holography. Accordingly, it has been desired to enhance the brightness of the holographically reconstructed image without decreasing the diffraction efficiency.

One method of increasing the brightness without decreasing the diffraction efficiency is to use a laser beam source of high power. However, the high power laser beam source is economically disadvantageous and occupies a large space. Particularly, in case of reconstructing color image holograms, it is practically impossible to use such high power laser beam sources of several colors.

In view of the above considerations, it has been desirable to use ordinary nonexpensive white light sources such as halogen lamps, mercury lamps, xenon lamps, etc. instead of multi-color laser beam sources as light sources for reconstruction of color hologram images. A color hologram from which a multi-color image can be reconstructed is known as a Lipmann type color hologram. The Lipmann type color hologram, however, is disadvantageous in that the diffraction efficiency is low and the duplication thereof is difficult. Further, since the interference pattern in the Lipmann type color hologram is recorded in parallel to the surface of the recording material, the photographic emulsion is shrunk after development and fixing processes which results in color shift in the multi-color reconstruction image by varying the spaces between stripes of the interference pattern.

SUMMARY OF THE INVENTION

In view of the above observations and description, the primary object of the present invention is to provide a device for reconstructing a color image hologram of a multi-colored object having no effect of diffusion by use of a white light source wherein a nonexpensive small light source can be used.

Another object of the present invention is to provide a device for reconstructing a color image hologram wherein an image having much higher brightness than the conventional images can be reconstructed.

Still another object of the present invention is to provide a device for reconstructing a color image hologram which can be observed by a number of people simultaneously even if it is projected on a large projection screen.

A further object of the present invention is to provide a device for reconstructing a color image hologram which does not have a speckle pattern.

The device for reconstructing a color image hologram in accordance with the present invention includes a white light source for illuminating a color image hologram having no effect of diffusion and a spectrum selecting means which selectively passes a desired spectrum of the primary or first order diffraction light from the hologram and makes the light passing therethrough impinge upon a diffusion screen to reconstruct a color image thereon, and is characterized in that said spectrum selecting means is provided not only with an aperture which has a width corresponding to the spatial frequency band width of the multi-color object to selectively pass the true color information of the object but also with a red filter adjacent to the aperture on the larger diffraction angle side and a blue filter adjacent to the aperture on the smaller diffraction angle side to enhance the brightness of the multi-color image reconstructed.

As for the light source for producing white light in the present invention, there can be used a light source which emits a plurality of line spectra in the range of visual wavelength, a light source which emits continuous spectra in a part of the range of visual wavelength, or a light source which emits a multi-color laser source including a plurality of laser beams of different wavelength.

Said color image hologram having no effect of diffusion means a color hologram recorded on a hologram recording material by forming an image of a transparent type multi-colored object (e.g., ordinary color slide film), which can be deemed to have no effect of diffusion on the recording material by illuminating the object with a non-diffusive laser beam.

Said diffusion screen employed in the present invention means a projection screen where the image formed thereon can be observed from a plurality of points including both the transparent type screen and the reflection type screen.

DESCRIPTION OF THE PREFERRED EMBODIMENT

Figure 1:
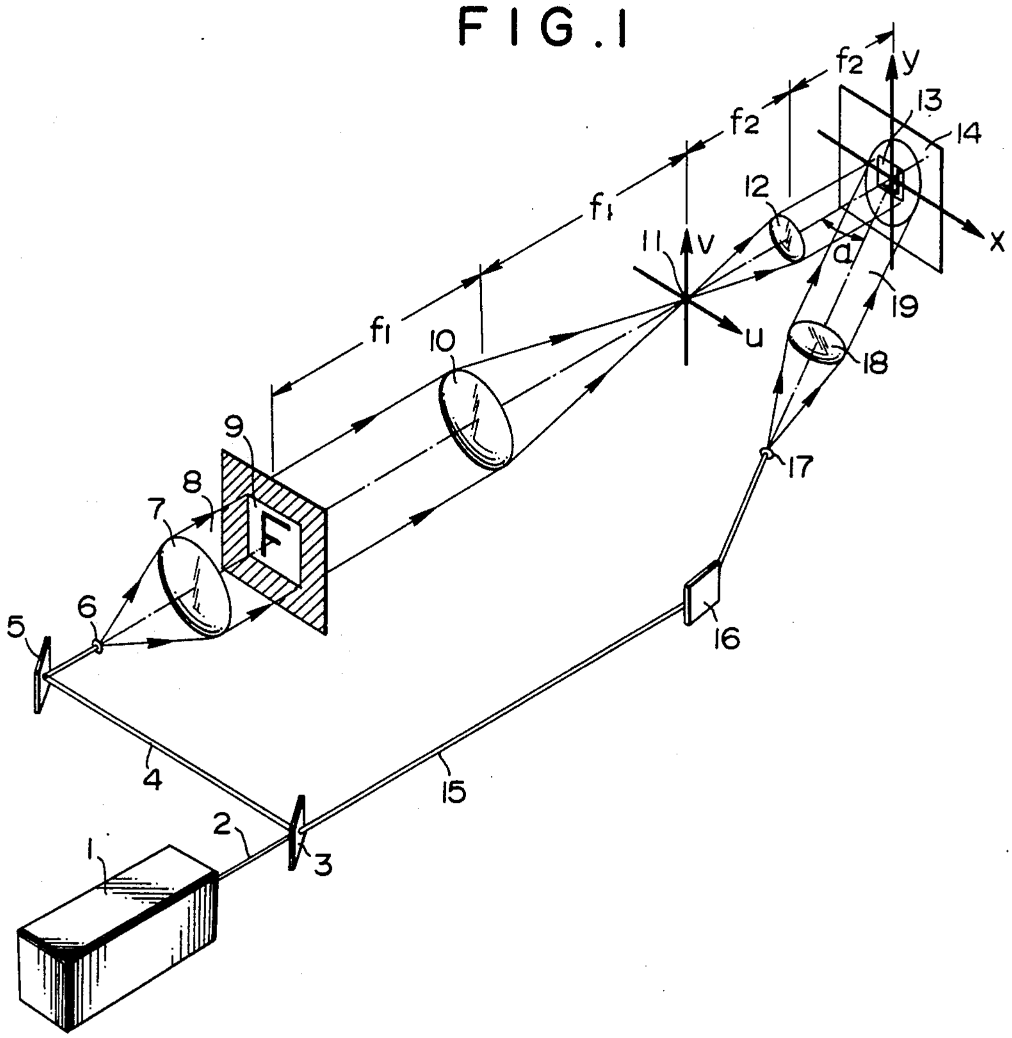
FIG. 1 is a schematic perspective view showing an optical system for recording image hologram having no effect of diffusion.

Referring to FIG. 1, a multi-color laser beam source 1 is employed for recordng a color image hologram. When a color hologram is recorded, usually three or four laser beams of different wavelength are employed. The wavelengths of these laser beams are selected to obtain good color reconstruction of the image obtained by the additive color process within the range of visual wavelength. For instance, wavelengths of 476.2μ, 520.8μ and 647.1μ obtained by a krypton laser beam source can be employed. Further, the wavelengths of 488.8μ and 514.5μ obtained by an argon laser beam source may be employed in combination with the wavelength of 632.8μ obtained by a helium-neon laser beam source. In the description hereinbelow, three laser beams of three different wavelengths will be employed for recording a color image hologram and the wavelength thereof will be designated by λB (blue light beam), λG (green) and λR (red). When recording interference patterns of three colors in superposition with each other, it is desirable to sequentially expose the recording material to laser beams of different wavelengths so that the recording material may be exposed to the laser beams of different wavelengths for the optimum time period determined by the spectral sensitivity of the recording material and the output power of the laser beams.

At first, a laser beam 2 of wavelength λB produced by the laser beam source 1 is divided into two light beams 4 and 15 by a beam splitter 3. The light beam 4 reflected by the beam splitter 3 is reflected by a mirror 5 and the diameter of the light beam 4 is enlarged by a beam enlarging lens system comprising two lenses 6 and 7. The enlarged beam 8 of collimated light illuminates a multi-color transparent object 9 having no effect of diffusion. The information concerning the wavelength λB of the multi-color object 9 is Fourier transformed by a lens 10 having the focal length of $f_1$ and forms a Fourier transformed image 11 on the *u–v* plane. By Fourier transforming again the Fourier transformed image 11 by use of a lens 12 having the focal length of $f_2$, an image 13 of the multi-color object 9 is formed on the *x–y* plane. The light which forms the image 13 on the *x–y* plane incident at right angle to the *x–y* plane is used as an object light beam for forming a hologram on a hologram recording recording material 14 placed on the *x–y* plane.

On the other hand, the light beam 15 passing through the beam splitter 3 is reflected by a mirror 16 and the diameter thereof is enlarged by a beam enlarging lens system comprising two lenses 17 and 18. The enlarged beam 19 of collimated light impinges on the recording material 14 at an angle $\alpha$ with respect to the optical axis of said lens 12 as a reference light beam. By recording an interference pattern formed by the object light and the reference light on the recording material 14, information concerning the wavelength λB of the object 9 is holographically recorded on the material 14.

Then, the laser beam produced by the laser beam source 1 is changed to the beams of the wavelengths λG and λR, sequentially, and interference patterns carrying information therefor are sequentially recorded on the same recording material 14 to superposedly record three kinds of interference patterns.

Figure 2:
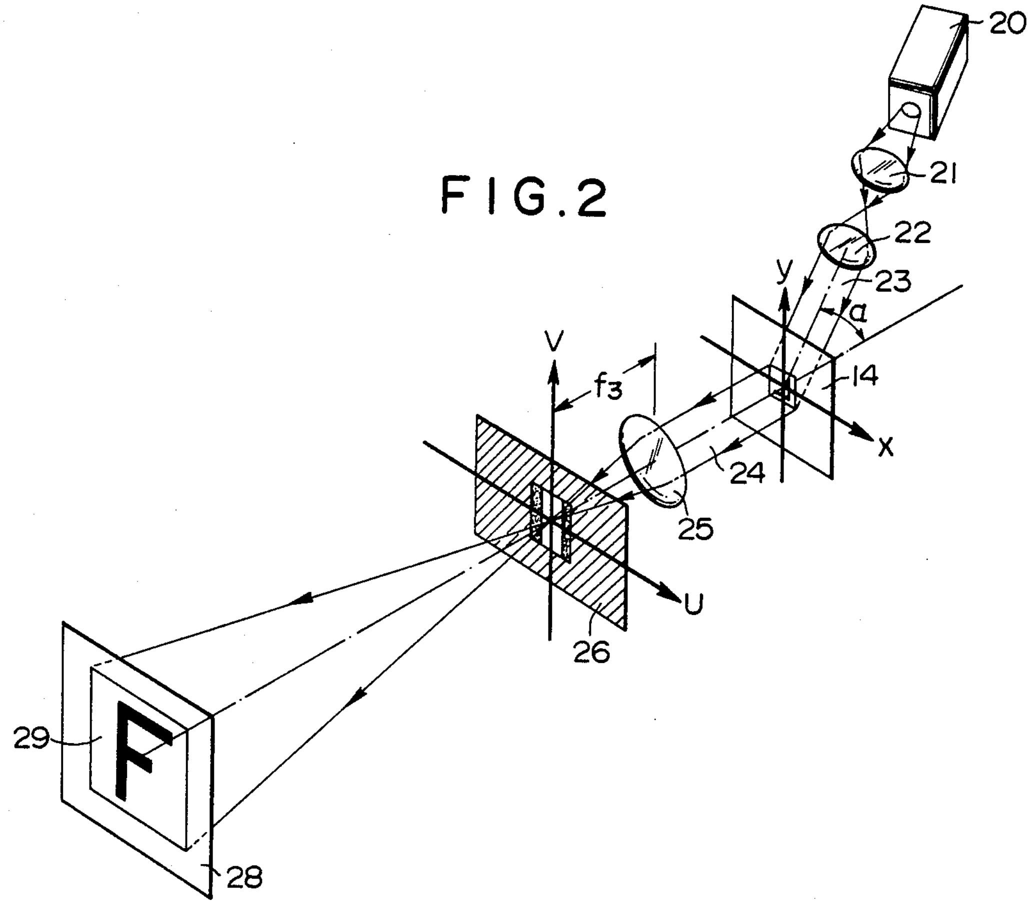
FIG. 2 is a schematic perspective view showing the optical system of the device for reconstructing a color image hologram in accordance with the present invention.

An embodiment of the device for reconstructing a color image hologram in accordance with the present invention is illustrated in FIG. 2 in which the color image hologram obtained by the recording system is shown in FIG. 1.

Referring to FIG. 2, a white light beam emitted from a white light source 20 such as a halogen lamp is collimated by a condenser lens 21 collimator lens 22 and made to impinge upon a hologram 14 prepared by said recording system. The collimated light 23 impinges upon the hologram 14 from the back side thereof at the same angle as said angle $\alpha$ at which said reference light beam 19 impinged thereon. Upon impingeing of the light 23 on the color hologram 14, a primary or first order diffraction light beam 24 emits from the hologram 14 which beam carries color information of the multi-color object 9. It should be noted that the collimated white light beam 23 must contain light beams having the wavelengths of λB, λG, and λR of the three laser beams used to record said hologram 14. In this embodiment, the white light beam 23 is assumed to contain said three wavelengths in a continuous spectra thereof. When the hologram 14 is illuminated by a white light source having such a continuous spectra, there is included in the primary or first order diffraction light beam 24 some components causing so-called color crosstalk beside the desired color information.

Figure 3:
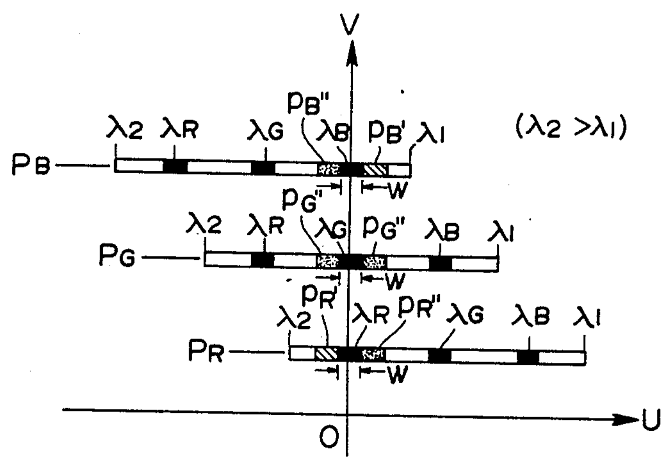
FIG. 3 is a view showing the primary or first order diffraction light spectra in the device for reconstructing the color image hologram in accordance with the present invention.
Figure 4A:
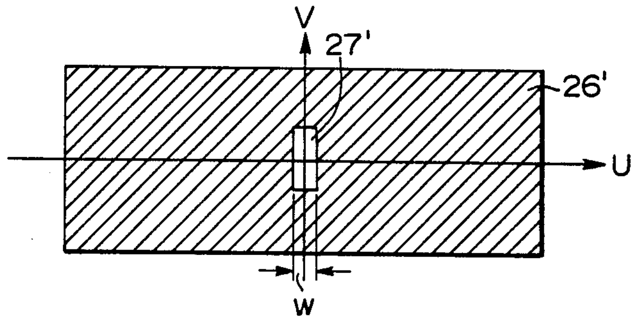
FIG. 4A is a front view of a spectrum selecting means employed in a conventional device for reconstructing a color image hologram.

In order to prevent the color crosstalk, it has been proposed to use a spectrum selecting means as shown in FIG. 4A. The principle of the spectrum selecting means is explained as follows with reference to FIG. 3. When a projection lens 25 having the focal length of $f_3$ is located behind the hologram 14 to focus an image formed by the primary or first order diffraction light beam 24, spectra of the primary diffraction light appear on the focal plane, U–V plane of the projection lens 25. FIG. 3 shows the spectra which appear on the U–V plane. The spectra of the diffraction light for the laser beam components of the wavelengths λB, λG, and λR are indicated by $P_B$, $P_G$ and $P_R$. Although these spectra are actually observed on the U-axis, they are illustrated separately for convenience. The true spectra included in the respective spectra $P_B$, $P_G$ and $P_R$ for the wavelengths of λB, λG and λR are indicated by λB, λG and λR, which appear at the same position on the U–V plane where U=V=O. These spectra have the width of *w* which corresponds to the spatial frequency band width (the width of the Fourier transformed image) of the object. Therefore, it is desirable to use a spectrum selecting means which selectively passes only these true spectra to prevent the color crosstalk. For this purpose, there has been used a spatial filter 26' as shown in FIG. 4A located on the U–V plane. The spatial filter 26' has a slit 27' of the width equal to said width $w$ of the band of the spatial frequency peculiar to the object. However, the conventional spatial filter 26' is disadvantageous in that the width of the slit 27' is too small to obtain a color image of sufficient brightness.

Figure 4B:
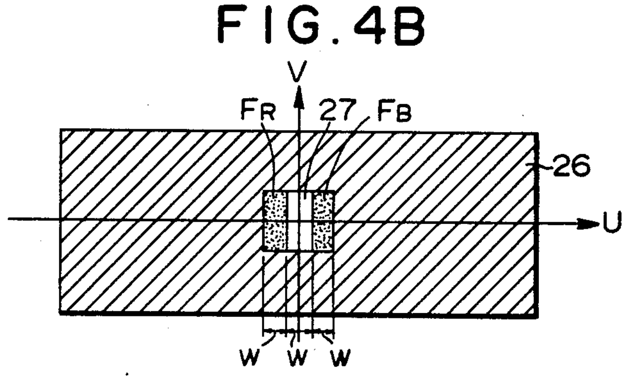
FIG. 4B is a front view of a spectrum selecting means employed in the present invention and FIG. 5 is a graph showing the preferable spectral transmission characteristic of the color filters employed in the present invention.
Figure 5:
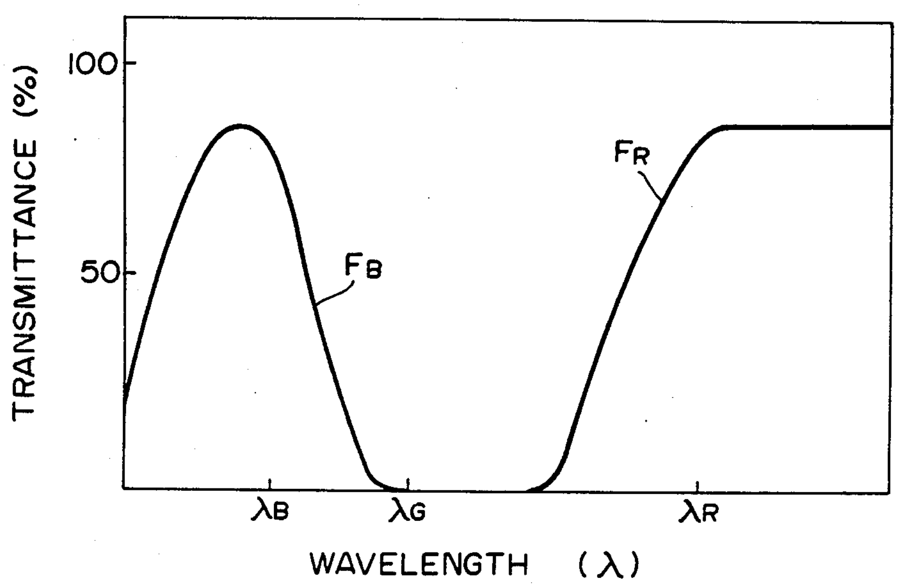

The present invention is characterized in that a spatial filter of particular structure as shown in FIG. 4B is used as a spectrum selecting means. The spatial filter 26 employed in the present invention is provided with a central slit 27 having the width equal to said width $w$ of the band of the spatial frequency peculiar to the object, and further provided with a red color filter $F_R$ and a blue color filter $F_B$ on the left and the right side of the slit 27. The left side is the side where the angle of diffraction is large and the right side is the side where the angle of diffraction is small. The width of the red and blue filters $F_R$ and $F_B$ are selected to be equal to said width $w$. The spectral transmission characteristic of the red and blue filters $F_R$ and $F_B$ should preferably be as shown in FIG. 5.

By using the spectrum selecting means 26 as explained hereinabove, a partial blue spectrum $P_B$, (see FIG. 3) passing through the blue filter $F_B$ and the partial red spectrum $P_R$, passing through the red filter $F_R$ are superposed on a multi-color image 29 formed on a projection screen 28. It has been found by the present inventors that these partial spectra do not deteriorate the quality of the image 29 but markedly enhance the brightness thereof. Particularly, since the hologram employed in this invention is of image hologram type, the magnification of the color crosstalk image and the position thereof are exactly registered with the true color image and accordingly the resolving power of the reconstructed image is not lowered by the spectrum selecting means 26.

It should be noted that the actually employed white light source does not generate a perfectly collimated light beam. Therefore, the width of the central slit 27 of the spectrum selecting means 26 is desirably made a little larger than said width $w$ to obtain an image of sufficiently enhanced brightness.

It will be readily understood by those skilled in the art that the number of laser beams employed is not limited to three. Any number of laser beams can be employed in the device of this invention.

What is claimed is:

1. A device for reconstructing a color image from a color image hologram having no effect of diffusion comprising a white light source which generates a white light beam containing light components of a plurality of wavelengths, first optical means for directing said white light beam to a color image hologram at an angle corresponding to the angle at which a reference light beam was incident in the hologram recording process to make the color image hologram.

second optical means for focusing a primary diffraction light beam from said color image hologram on a focusing plane, a spectrum selecting means located on said focusing plane, said spectrum selecting means comprises a slit having a width corresponding to the width of the band of the spatial frequency of the object which is recorded in said color image hologram, a red filter provided adjacent to said slit on the larger diffraction angle side and a blue filter provided adjacent to said slit on the smaller diffraction angle side, and a diffusion projection screen located behind said spectrum selecting means to visualize a color image which is holographically reconstructed by said primary diffraction light beam.

2. A device for reconstructing a color image hologram as claimed in claim 1 wherein the width of said red filter and blue filter is equal to said width of the band of the spatial frequency of the object.

3. A device for reconstructing a color image hologram as claimed in claim 1 wherein said white light source is a multi-color laser beam source.

4. A device for reconstructing a color image hologram as claimed in claim 3 wherein said multi-color laser beam source is a krypton laser source.

5. A device for reconstructing a color image hologram as claimed in claim 3 wherein said multi-color laser beam source is a combination of an argon laser beam source and a helium-neon laser beam source.

6. A device for reconstructing a color image hologram as claimed in claim 1 wherein said diffusion screen is a reflection type screen.

7. A device for reconstructing a color image hologram as claimed in claim 1 wherein said diffusion screen is a transparent type screen.

8. A device for reconstructing a color image hologram as claimed in claim 1 wherein said white light source generates at least three light beams of the primary three colors.

* * * * *